United States Patent [19]

Kurahashi et al.

[11] Patent Number: 5,140,438
[45] Date of Patent: Aug. 18, 1992

[54] FACSIMILE APPARATUS

[75] Inventors: Yoshiyuki Kurahashi; Masanori Yamamoto, both of Osaka, Japan

[73] Assignee: Minolta Camera Kabushiki Kaisha, Osaka, Japan

[21] Appl. No.: 477,036

[22] Filed: Feb. 8, 1990

[30] Foreign Application Priority Data

Feb. 13, 1989 [JP] Japan ............... 1-016036[U]
Feb. 13, 1989 [JP] Japan ............... 1-016037[U]
Feb. 13, 1989 [JP] Japan ............... 1-034675

[51] Int. Cl.⁵ .............................. H04N 1/04
[52] U.S. Cl. .......................... 358/401; 358/476
[58] Field of Search ............ 358/400, 401, 468, 474, 358/486, 494, 296, 498, 493, 476, 297, 298, 299, 300, 301, 302, 496; 346/145; 361/391; 379/100

[56] References Cited

U.S. PATENT DOCUMENTS 4,562,444 12/1985 Nagashima et al. ........... 358/296
4,695,898 9/1987 Ishikawa et al. ............... 358/296
4,750,047 6/1988 Kotani et al. ................... 346/145
4,754,337 6/1988 Nohtomi et al. ................ 358/401
4,774,590 9/1988 Haganuma et al. ............. 358/401

FOREIGN PATENT DOCUMENTS

63-267058 11/1988 Japan .

Primary Examiner—Edward L. Coles, Sr.
Assistant Examiner—Jerome Grant, II
Attorney, Agent, or Firm—Willian Brinks Olds Hofer Gilson & Lione

[57] ABSTRACT

In a facsimile apparatus, a recording section unit has a clamshell structure in which an upper portion can be opened upwardly with respect to a lower portion. The recording section unit is disposed on a reading section unit and an image processing section unit arranged horizontally which are provided adjacently to one another, and the upper portion of the recording section unit can be opened and closed independently of the lower portion, the reading section unit, and the image processing section unit.

19 Claims, 11 Drawing Sheets

FACSIMILE APPARATUS

BACKGROUND OF THE INVENTION

1. Techinical Field of the Invention

The present invention relates to a facsimile apparatus, and particularly to arrangement and structure of sections of a facsimile apparatus.

2. Brief Description of the Related Arts

A facsimile apparatus generally comprises a reading section for reading an original to be transmitted and converting the original into an image signal, an image processing section for processing signals for transmission and receiving, and a recording section of an electrophotographic type for reproducing an image on a recording paper from a received signal.

As a recording section of an ordinary facsimile apparatus, a thermal recording type has been generally used. However, a recording section of a thermal recording type has disadvantages in respects of high speed recording reproductivity of a halftone image, a picture quality, retentivity of recorded images and the like, and can hardly correspond enough to increased speed and picture quality in the recent communication.

On the other hand, a recording device of an electrophotographic type uses as an image forming section of a copying apparatus, a laser printer and the like and is more advantageous in the above-mentioned respects than the thermal type. Further, since an ordinary paper can be used as a recording paper in an electrophotographic recording device, the electrophotographic recording device has a good maintenance and requires only a low running cost. Furthermore, a color image can be recorded by the electrophotographic recording device. Thus an electrophotographic recording device has many advantages. With these advantages, the electrophotographic recording device has many uses and high technical and commercial qualities.

With such a background, in recent facsimile apparatus of a class higher than the middle one, the electrophotographic recording device is used as the recording section, and the reading section and the image processing section are functionally connected to the recording section, and further the shape and appearance of the apparatus has been designed for convenient use.

In short, in such a conventional facsimile apparatus, the electrophotographic recording section having a large size and weight is settled as a main part and the reading section and image processing section are arranged thereon or therearound.

However, the facsimile apparatus in which the reading section and the image processing section are arranged on the recording section has the following problems.

Generally, in an electrophotographic recording device, a container member of a clamshell type is adopted in order to easily settle paper jamming, in which with a paper transfer path forming a boundary, an upper unit thereabove and a lower unit therebelow are connected to each other through a hinge, and the upper unit can be upwardly opened and closed.

If such a clamshell structure is adopted as the recording section of the facsimile apparatus, the reading section and the image processing section are arranged on the upper unit. Therefore, the upper unit has to have a structure and a strength capable of supporting the weights of the reading section and the image processing section and also of being opened and closed. Further, a spring force of a torsion spring for urging the upper unit upwardly has to be set according to the above-mentioned structure and strength, resulting in that the design of the recording section is limited.

Consequently, the structure of the upper unit has to be changed according to the weight and size of the reading section and the image processing section. Therefore, a common type of recording section can hardly be applied in various types of facsimile apparatus products having the difference in the largest transmittable original sizes, G III or G IV correspondence, and the like. And verious kinds of recording sections have to be designed and manufactured for various type of facsimile apparatus products, which is disadvantageous for the standardization of the products.

In order to eliminate the above-mentioned disadvantages, a facsimile apparatus has been provided in which the whole of the recording section is contained in a container member and adapted to be pulled forwardly out of the container member, the recording section and the image processing section being fitted onto the container member. However, such an apparatus becomes large-sized and heavy.

Further, a facsimile apparatus in which the reading section and the image processing section are arranged around the recording section has not such a problem of design as above-mentioned, but the occupation area of the whole apparatus becomes large.

On the other hand, in a facsimile apparatus, a paper feed tray for feeding an original for transmission is usually provided.

A paper feed tray is of a one-side basic position type or a center basic position type. A paper feed tray of a one-side basic position type comprises a tray body for mounting a paper thereon, a fixed guide which projects upwardly at one end portion of the tray body and extends in a paper transporting direction, and a movable guide member which projects from the upper surface of the tray body and extends in parallel with the fixed guide member and is movable in a direction of the width of the paper. A paper feed tray of a center base position type has, instead of a fixed guide member, a pair of movable guide members movable in the opposite directions. Such a conventional paper feed tray is most convenient to use when it is fitted to the front part of the facsimile apparatus. However, sometimes such a paper feed tray is fitted to a side of the facsimile apparatus because of a mechanical need of the apparatus. In this case, an operator has to go to the side of the facsimile apparatus so that the paper feed tray is in front of the operator, or set an original into the paper feed tray by one hand from the front position of the apparatus.

However, it is very troublesome for the operator to go to the side of the facsimile apparatus to set an original. Further, the movable guide member has to be moved so as to correspond to the size of the width of the original. However, since the movable guide member in a conventional paper feed tray is at a position far from an operator, the operator in front of the facsimile apparatus cannot easily operate the movable guide member.

SUMMARY OF THE INVENTION

A main object of the present invention is to provide a facsimile apparatus which is convenient to be used and maintained.

Another object of the present invention is to provide a compact facsimile apparatus which does not require a large occupation area.

A further object of the present invention is to provide a facsimile apparatus whose recording section is applicable to various types of facsimile apparatuses.

A further object of the present invention is to provide a facsimile apparatus in which a paper feed tray for feeding an original and a discharge portion for discharging a recording material can be arranged without the limitation of the arrangement position.

Further objects and features of the present invention will become apparent from the following description given with reference to the appended drawings.

BRIEF DESCRIPTION OF THE DRAWINGS

In the embodiments, similar parts are indicated by similar numerals and marks, and repeated description will be omitted in the following.

DETAILED DESCRIPTION OF THE PREFERRED EMBODIMENTS

Now, embodiments of the present invention will be described in the following with reference to the appended drawings.

FIGS. 1 to 10 show a facsimile apparatus 1 as an embodiment of the present invention.

Figure 1:
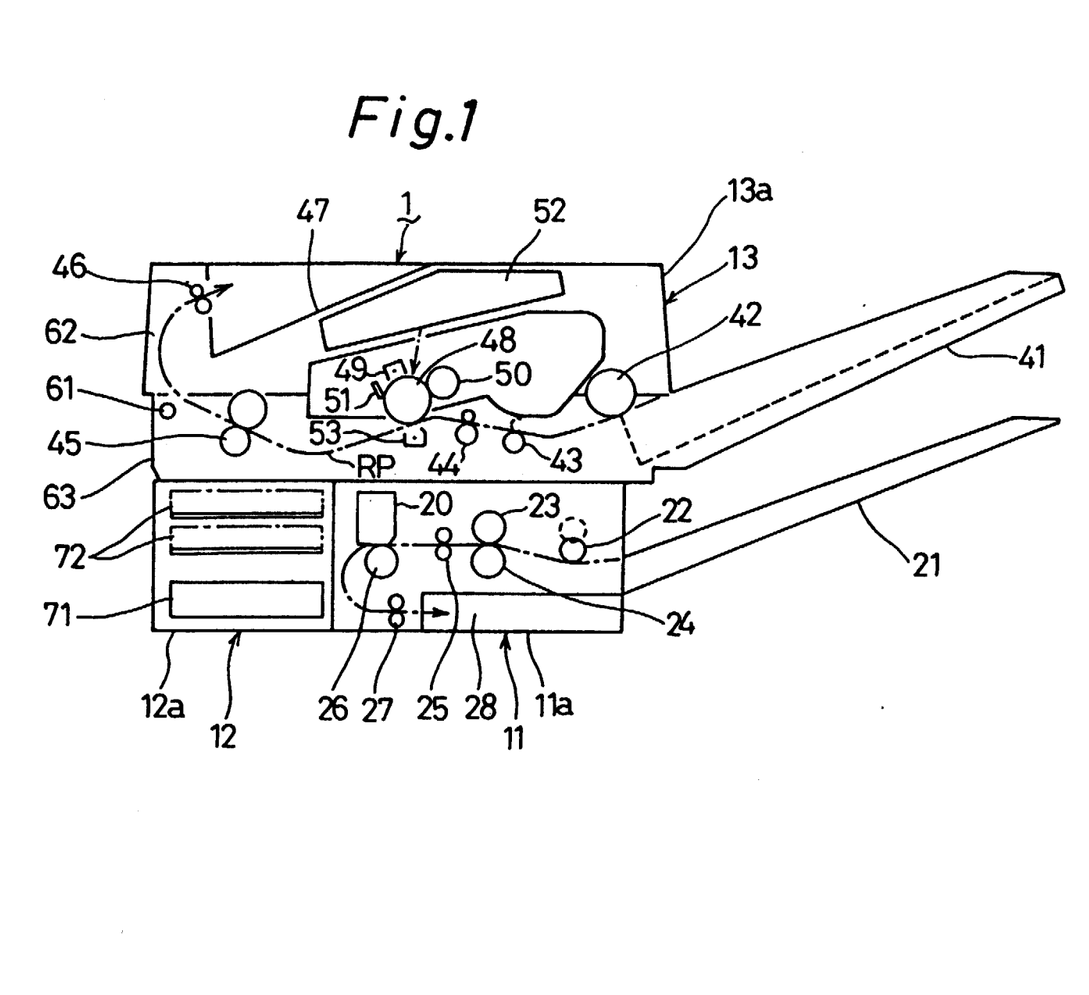
FIG. 1 is an elevational view in section a first embodiment of a facsimile apparatus according to the present invention.

As shown in FIG. 1, the fascimile apparatus 1 comprises a reading section 11 for reading an original to be transmitted and converting the original into image signals, an image processing section 12 for processing signals to be transmitted or received, and an electrophotographic recording section 13 for reproducing images from the received signals.

Each of the reading section 11, the image processing section 12 and the recording section 13 is contained in separate box 11a, 12a, or 13a to form a unit. The reading section and the image prcessing section are positioned below the recording section.

Figure 3:
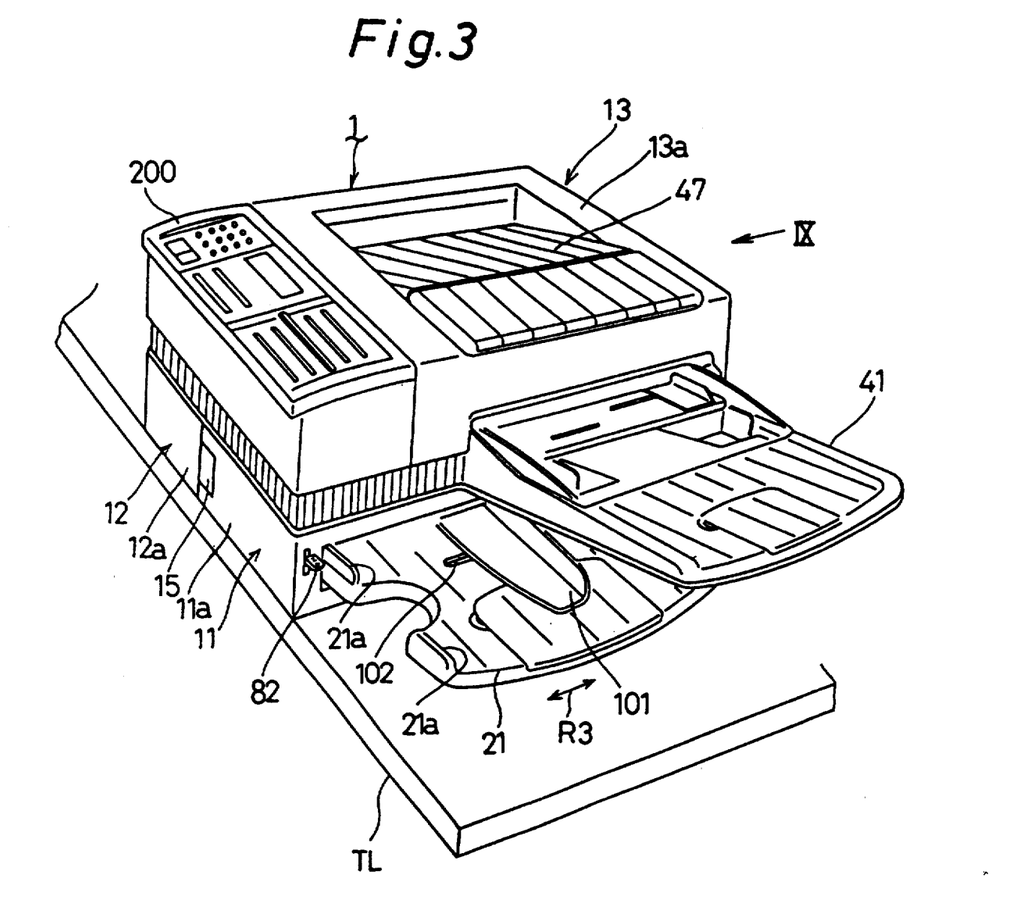
FIG. 3 is a perspective view of the facsimile apparatus.

In the reading section 11, there are provided an image sensor 20, an original tray 21 for mounting an original therein, a pick up roller 22, a right rotation roller 23, a reverse rotation rollers 24, a pair of transport roller 25, a reading roller 26, a pair of discharge rollers 27 and the like. As shown in FIG. 3, the original tray 21 is fitted in such a manner that a side wall 115 of the original tray 21 is a basic position for one end of an original, and for this purpose, the original tray 21 is provided with fixed guide members 21a at the side wall 115. The other end of the original is guided by a guide member 101 which is movable along a groove 102 in a direction of the arrow R3 in FIG. 3. Though the original tray 21 is disposed below a paper cassette 41 in the recording section 13, it is provided non-parallel with the paper cassette 41 and is protruded toward the front side on which an operation panel 200 (referred to as "the front" hereinafter) from the paper cassette 41. Accordingly, it is very easy to set the original into the original tray.

Returning to FIG. 1, the original set in the original tray 21 is transported by each of the above-mentioned rollers and discharged to a discharge section 28. During this operation, images on the original are read by the image sensor 20, and image signals issued from the image sensor 20 are transmitted to a processing portion 302 in a control section 300 of the facsimile apparatus shown in FIG. 8.

Figure 9:
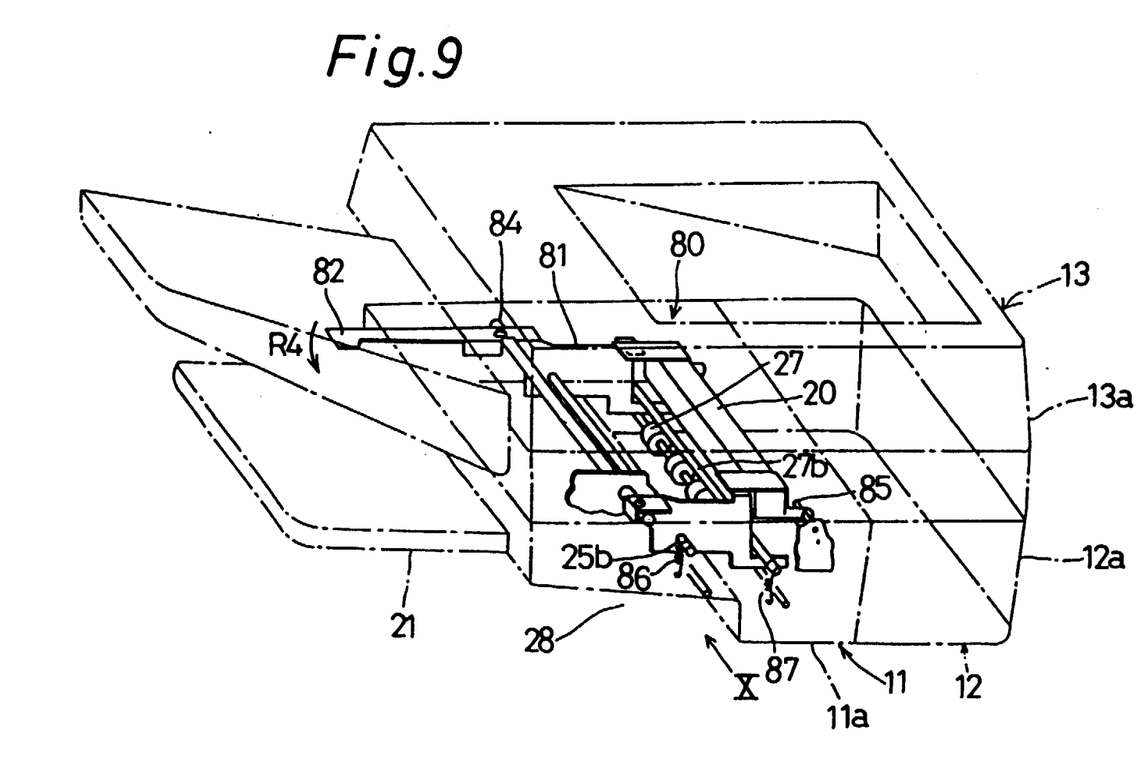
FIG. 9 is an opened-up perspective view of a release mechanism of the reading section seen in the direction of the arrow IX of FIG. 3.
Figure 10:
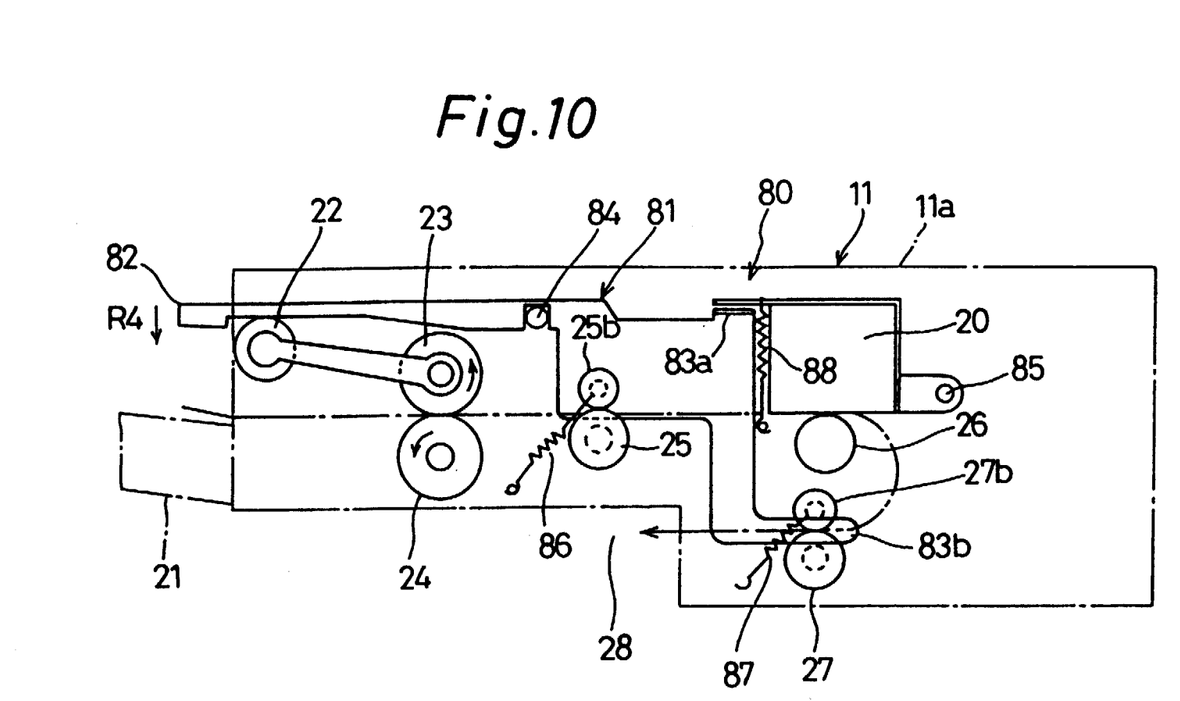
FIG. 10 is a perspective view of the release mechanism of FIG. 9 seen in the direction of the arrow X.

The reading section 11 has a release mechanism 80 for removing the original jammed in that section 11 as shown in FIGS. 9 and 10. As usual, pressure rollers 25b, 27b and the image sensor 20 are urged raspectively against the transport roller 25, the reading roller 26 and the discharge roller 27 with an adequate strength of force by springs 86, 87, 88, and the original is transported by being held between these rollers. When the original is jammed, a release member 82 protruding from the box 11a is pushed downwardly (in a direction of the arrow R4 shown in the figure). Thereby, a release lever 81 is pivoted about a support shaft 84, and the pressure rollers 25b, 27b are moved upwardly by the release lever 81 or a projecting portion 83b thereof. Then, the image sensor 20 is pivoted upwardly about a shaft 85 by means of a pressing portion 83a. As a result, the pressure rollers 25b, 27b and the image sensor 20 are apart from the transfer roller 25, the reading roller 26 and discharge roller respectively. Consequently, the jammed original is pulled out through the original tray 21 or the discharge part 28, and the jamming can be easily settled without causing damage to the original.

In the image processing section 12, necessary equipment for a facsimile apparatus other than those of the reading section 11 and the recording section 13, such as for example an electric source device 71, a noise filter, various kinds of printed wire plates 72 such as the operating part 302, a memory 304 (FIG. 8) and the like in the control section 300, and if necessary, a hard disk device, an IC card and the like are concentratedly contained in the box 12a formed of steel plates and connected to an earth potential. Therefore, the electrical parts are shielded from the outside. Further, they have an improved noiseproof ability against outer noise and radiant noises emitted from the parts themselves. And at the same time, the functions of the parts are combined and the length of the harness can be shortened or reduced.

Figure 2:
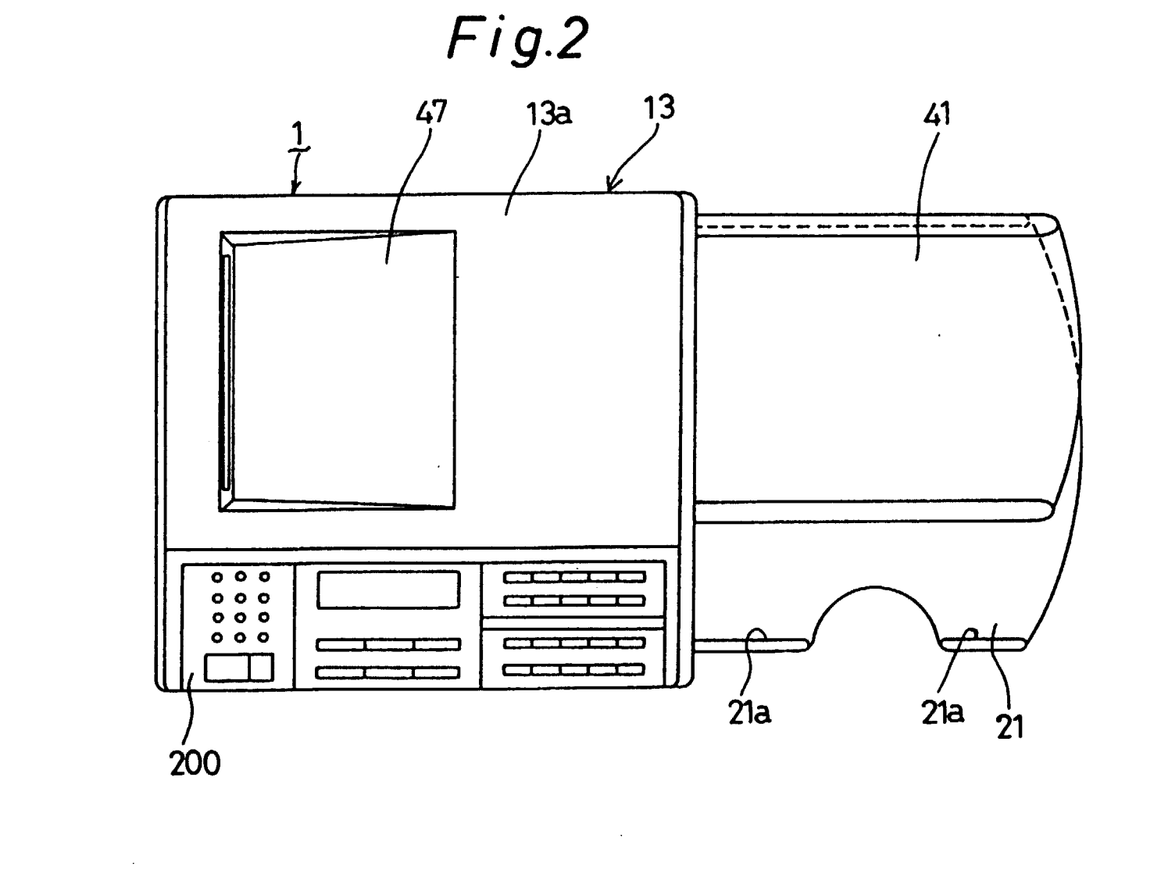
FIG. 2 is a plan view of the facsimile apparatus.

In the recording section 13, there are provided a paper cassette 41 in which paper for recording received images are set, various kinds of rollers 42 to 46 for transporting paper out of the paper cassette 41 at an adequate timing (including a fixing roller 45), a discharge tray 47 into which recorded papers are discharged, a photoconductive drum 48, a static charger 49, a developing unit 50, a transfer charger 53, a cleaner 51, a laser light emitting device containing a laser diode therein and the like. Referring to FIG. 2, the paper cassette 41 is fitted so as to be biased at the back of the right side of the recording section 13 for being prevented from being on top of the original tray 21 as mentioned above and for the internal structure of the recording section 13. Further, an operation panel 200 for operating the facsimile apparatus is provided at the front part of the upper surface of the recording section 13. The front face of the facsimile apparatus 1 is a side at which the operation panel is provided and the facsimile apparatus is operated from this side.

In the recording section 13, an image in correspodence with a signal inputted into the laser light emitting portion 52 is recorded on a recording paper transferred from the paper cassette 41 through an electrophotographic process. The image recorded papers are discharged onto the discharge tray 47 with the surface of the paper on which the images are recorded facing the upper surface of the discharge tray 47 and the pages being in proper order.

Figure 7:
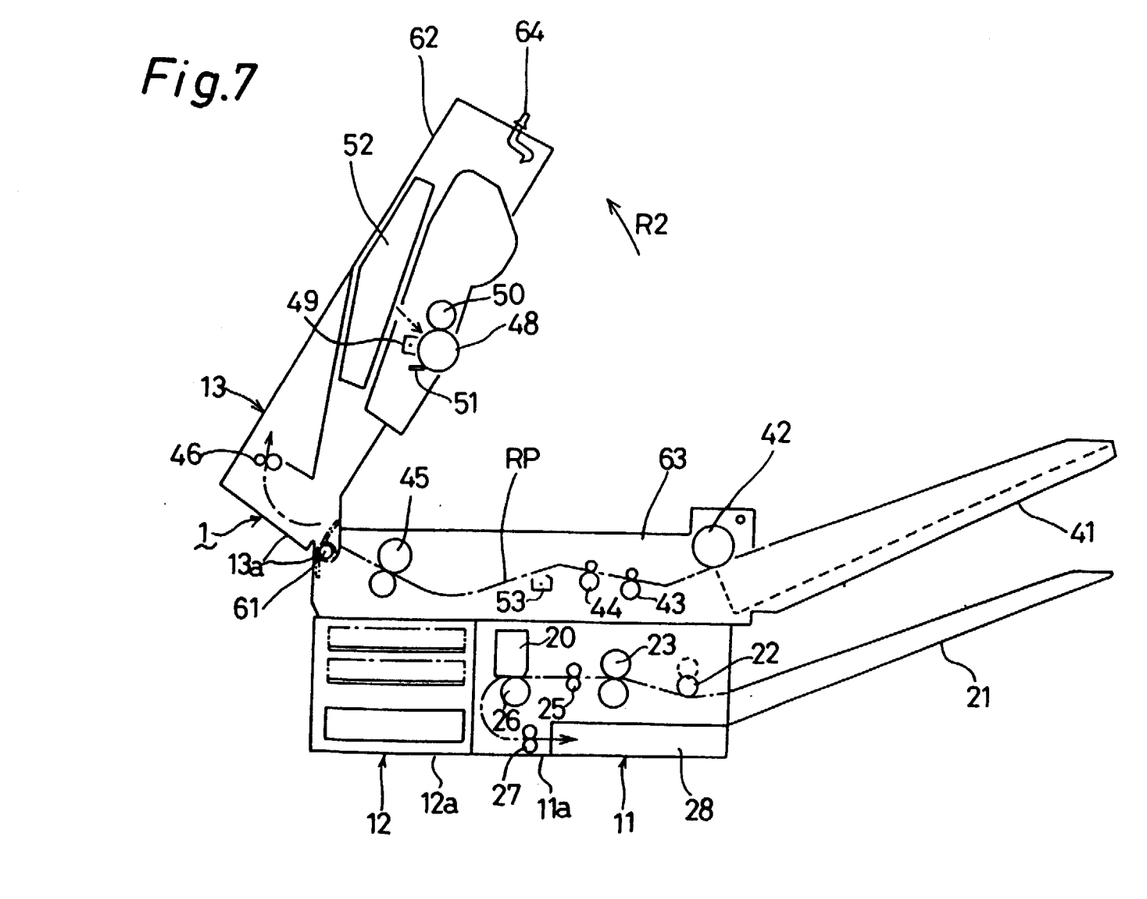
FIG. 7 is an elevational view in section of the facsimile apparatus with an upper unit of the recording section opened.

FIG. 7 is an elevational view in section showing an upper unit 62 of the recording section 13 being opened. The surface of the box 13a of the recording section 13 is covered with a synthetic resin. The box 13a is divided into an upper part 62 and a lower part 63. The upper part 62 can be opened and closed with respect to the lower part 63 through a hinge 61. The mechanism in the box 13a of the recording section 13 is divided into two by a paper transport path RP as a boundary, and the upper part of the mechanism above the paper transport path RP forms the upper unit 62 and the lower part of the mechanism there below forms the lower unit 63. In short, the mechanism of the recording section 13 is constituted by the upper unit 62 and the lower unit 63 which are opened and closed through the hinge 61 to have a clamshell structure. In order to facilitate the opening and closing operation of the upper unit 62 and to keep the upper unit 62 at the opened position, a torsion spring, a gas spring or the like (not shown) having a spring force in correspondence with the weight of the upper unit 62 is provided between the upper unit 62 and the lower unit 63.

Therefore, when a recording paper is jammed in the paper transport path RP, the upper unit 62 and the lower unit 63 are disengaged from each other by operating the lever 64, and the upper unit 62 is opened upwardly by pivoting the upper unit 62 about the hinge 61 (in a direction of the arrow R2 shown in FIG. 7), so that the jammed paper can be easily removed.

Figure 5:
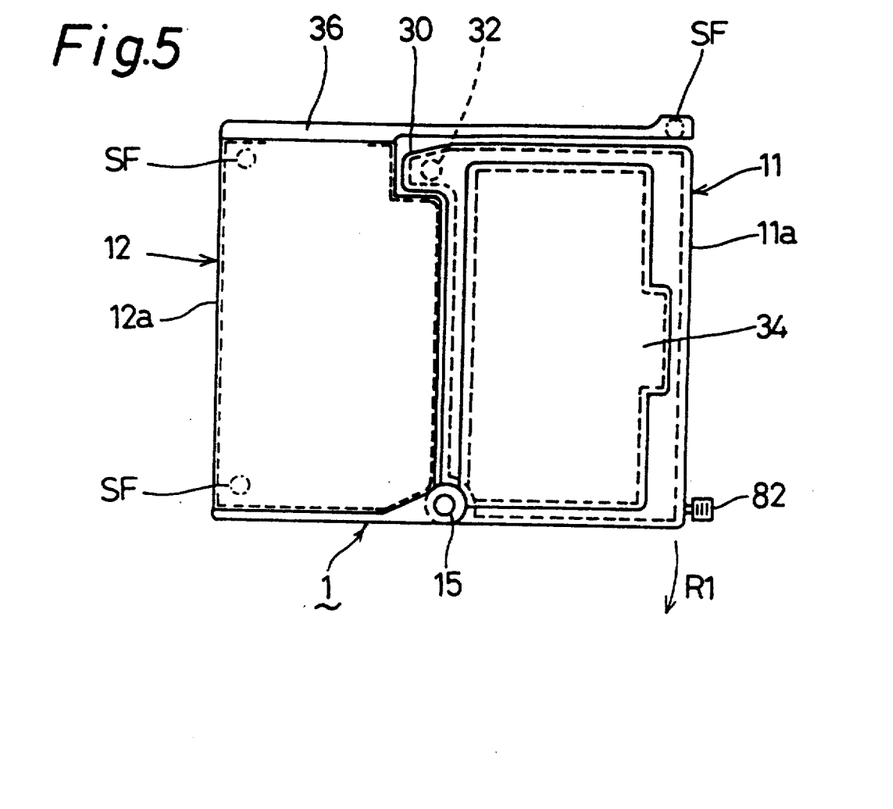
FIG. 5 is a plan view of the facsimile apparatus with a recording section removed away.

FIG. 5 is a plan view of the facsimile apparatus from which the recording section 13 is removed.

The reading section 11 is connected through a hinge 15 to an end portion of the image processing section 12 and it can be pulled out by pivoting the recording section 11 about the hinge 15 toward the front through an angle of 90 degrees.

Figure 6:
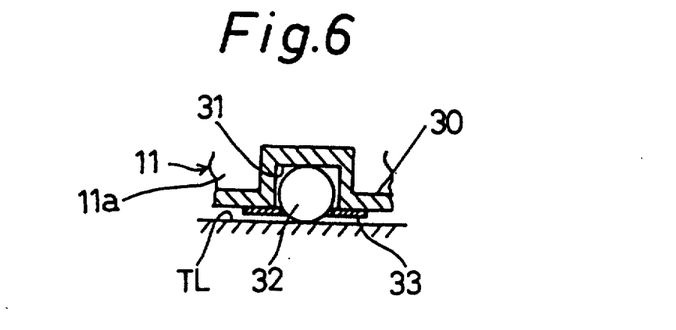
FIG. 6 is a sectional view of a part of the bottom of the reading section.

At a corner of the reading section 11, a projection 30 is provided. As shown in FIG. 6, a recess 31 is provided in the lower surface of the projection 30. A ball 32 is fitted into the recess 31 and prevented from being disengaged by a cover 33. When the facsimile apparatus 1 is settled on a table TL, the ball 32 which is between the reading section 11 and the upper surface of the table TL supports a part of the weight of the reading section 11. Further, when the reading section 11 is pivoted, the ball 32 rolls on the table TL so that the reading section 11 can be smoothly pulled out.

As shown in FIG. 5, a cover 34 is removable provided on the upper surface of the box 11a of the reading section 11. By removing the cover, the internal structure of the box 11a can be easily examined.

Further, in the image processing section 12, a support member 36 for mounting the recording section 13 thereon is fitted through a screw to the box 12a. A rubber leg (not shown) is fitted to the lower surface of the recording section 13. The recording section 13 is settled in such a manner that the rubber leg thereof is supported at three support points SF on the upper surface of the image processing section 12. Therefore, the reading section 11 can be pivoted without contacting with the recording section 13.

Figure 4:
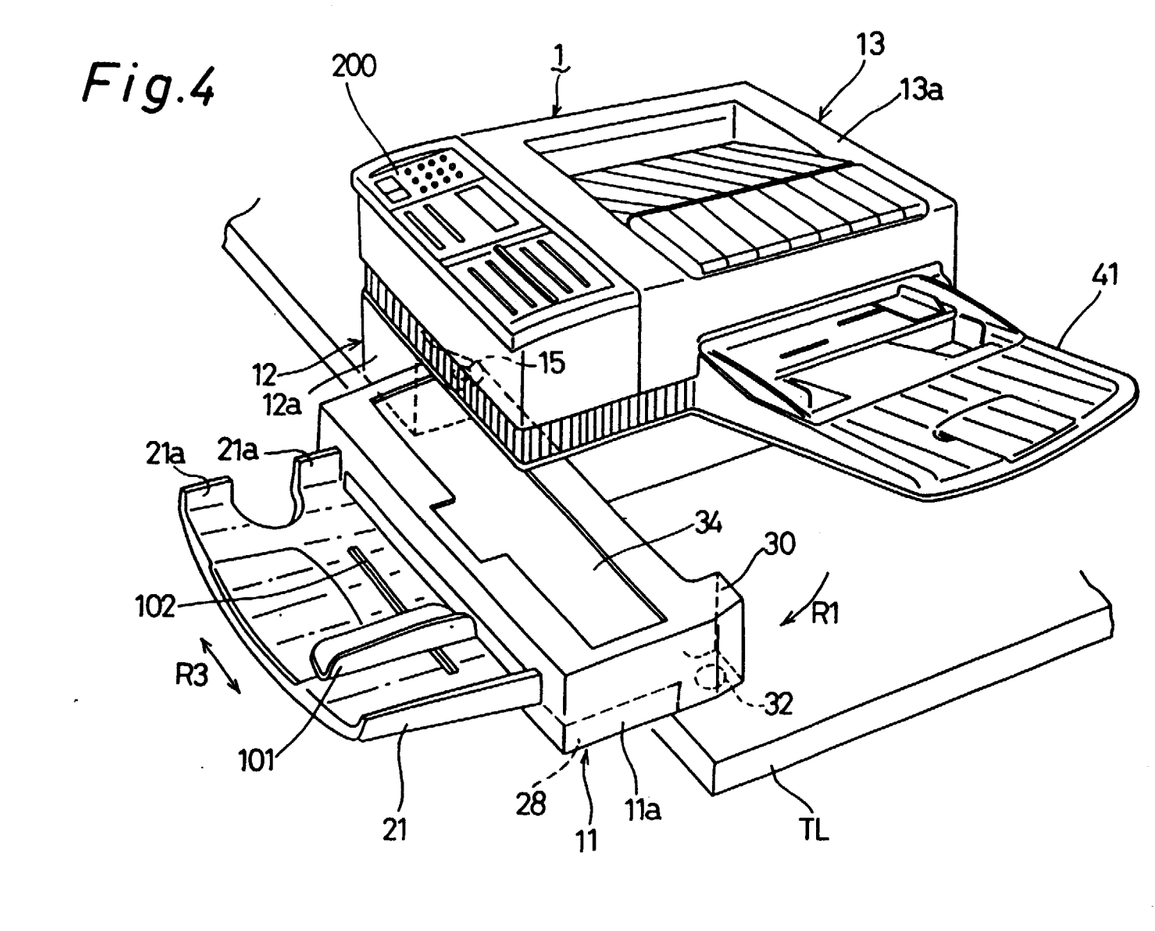
FIG. 4 is a perspective view of the facsimile apparatus with a reading section pulled out.

When the reading section 11 is pulled out as shown in FIG. 4, the discharge part 28 protrudes from the upper surface of the table TL. Accordingly, after an original for transmission is read and then discharged, it does not remain between the discharge part 28 and the upper surface of the table TL but can fall down downwardly, therefore, even a long-sized original can be prevented from being jammed.

Further, by pulling out the reading section 11, the original tray cames in the front position, and therefore the original is easily set. Furthermore, operations for maintaining the reading section 11 such as settling of jamming in the reading section 11, cleaning, inspection and repair can be easily carried out.

Figure 8:
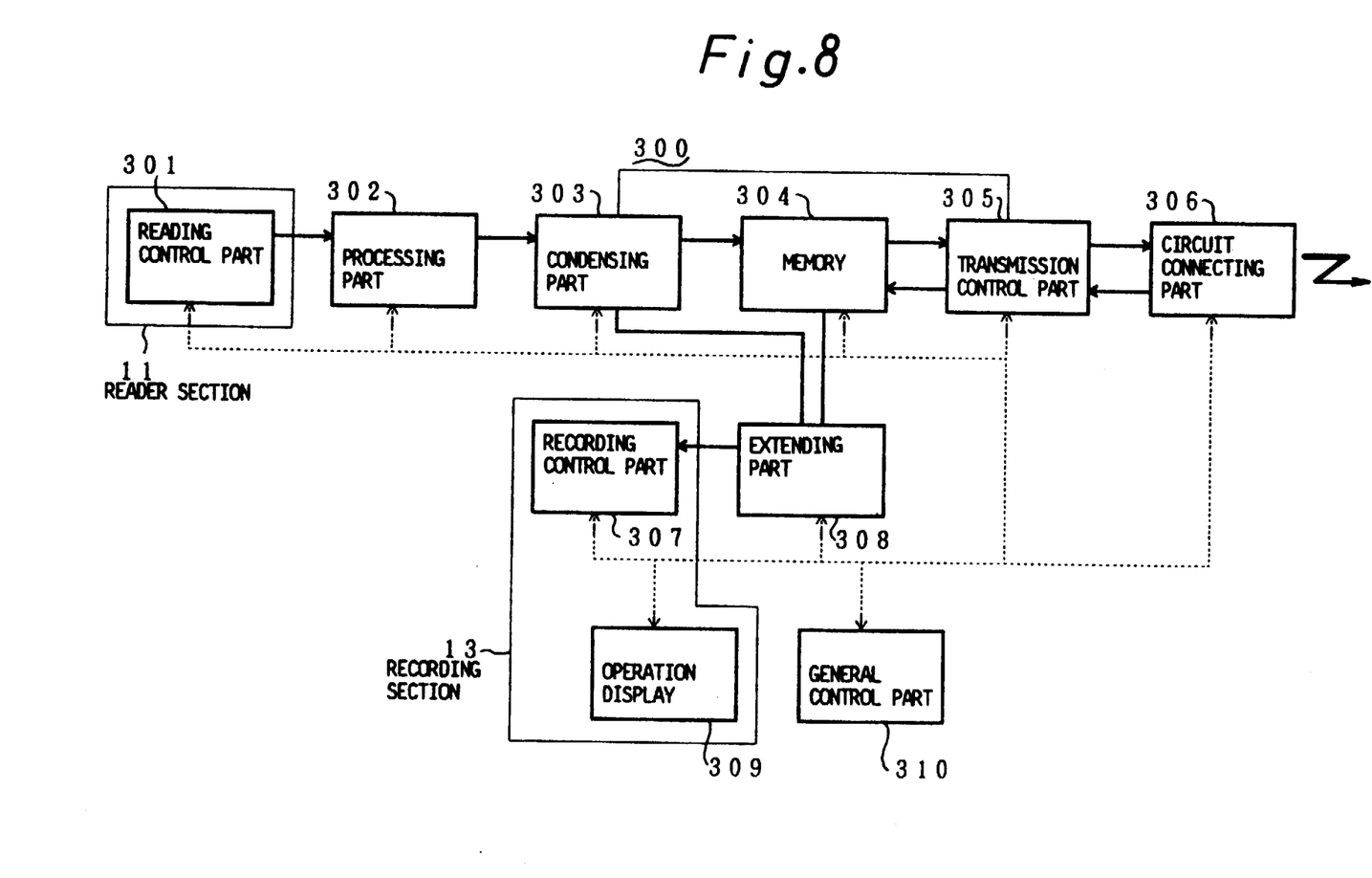
FIG. 8 is a circuit block diagram of a control section of the facsimile apparatus.

As shown in FIG. 8, the control section 300 comprises a reading control portion 301 for controlling a scanning drive system such as the image sensor 20 and illuminating lamp of the reading section 11, a processing portion 302 for executing digital-conversion of an image signal from the reading section 11 to correct the digital data by gamma-conversion or the like and process the data into two-valued data and the like, a compressing portion 303 for compressing the data issued from the processing portion 302, a memory 304 for storing the data outputted from the compressing portion 303 or a transmission control portion 305, the transmission control portion 305 for converting the date for transmission and receiving, a circuit connecting portion 306 for converting signals between serial digital signals and analogue signals used for a public telephone circuit, an extending portion 308 for extending compressed data outputted from the memory 304 to be the original data, a recording control portion 307 for controlling the light emission intensity of a laser diode based on data outputted from the extending portion 308 and controlling the whole of the recording section 13 including the recording paper transporting, an operation display portion 309 for controlling the key operation and display in the operation panel 200, and a total control portions 310 for controlling the whole of these portion.

Among the above-mentioned portions the reading control section 301 is connected to the reading section 11, and the recording control portion 307, and the operation display portion 309 are connected to the recording section 13, and other portions connected to the image processing section 12. Between each of the reading section 11, the image processing section 12 and the recording section 13, proper harnesses are provided as mentioned above so as to supply electricity and transmit or receive signals.

According to the above-mentioned embodiment, each of the reading section 11, the image processing section 12 and the recording section 13 is formed as a unit and accommodated in each of the boxes 11a, 12a and 13a. Therefore, electrical equipments and other parts are shielded from the outside, and noiseproof ability thereof against outer noises is improved and radiant noises thereof are reduced. And at the same time, since the electric parts such as print plate unit 72 (Sea FIG. 1.) are concentratedly accommodated in the image processing section 12, the length of the harnesses can be shortened or reduced.

For the arrangement in which the recording section is arranged above the reading section 11, and the image processing section 12, the occupation area of the facsimile apparatus 1 is only the sum of the area of the reading section 11 and the image processing section 12, and the area necessary for settling the facsimile apparatus is small. Further, since above the recording section 13, are not mounted the reading section 11 and the image processing section 12, the upper unit 62 of the recording section 13 can be opened and closed independetly of the reading section 11 and the image processing section 12. Accordingly, the structure, rigidness, strength and the like of the parts of the recording section 13 such as the upper unit 62, the hinge 61, the torsion spring or the gas spring and the like can be designed regardless of the weights of the reading section 11 and the image processing section. As a result, the recording section 13 can be freely designed and common recording section can be easily used for various kinds of facsimile apparatus.

In addition, since the reading section 11 and the recording section 13 are disposed just above or just at the side of the image processing section 12, the harnesses connecting these sections are shortened.

According to the above-mentioned embodiment, though both of the original tray 21 and the paper cassette 41 are fitted to the side of the facsimile apparatus 1, the original tray 21 is provided non-parallel with the paper cassette 41 so as to be protruded toward the front from the paper cassette 41. Therefore, it is very easy to set the original into the original tray 21. By pivoting and pulling out the reading section 11, the original can be also easily set in the original tray 21, and even a long original can be prevented from being jammed in the discharge part 28. Thus, the facsimile apparatus 1 of this embodiment can be easily oprated and maintained.

As an original tray 21, a tray may be used in which a guide member adjusting lever is fitted to the movable guide member 101.

Figure 11:
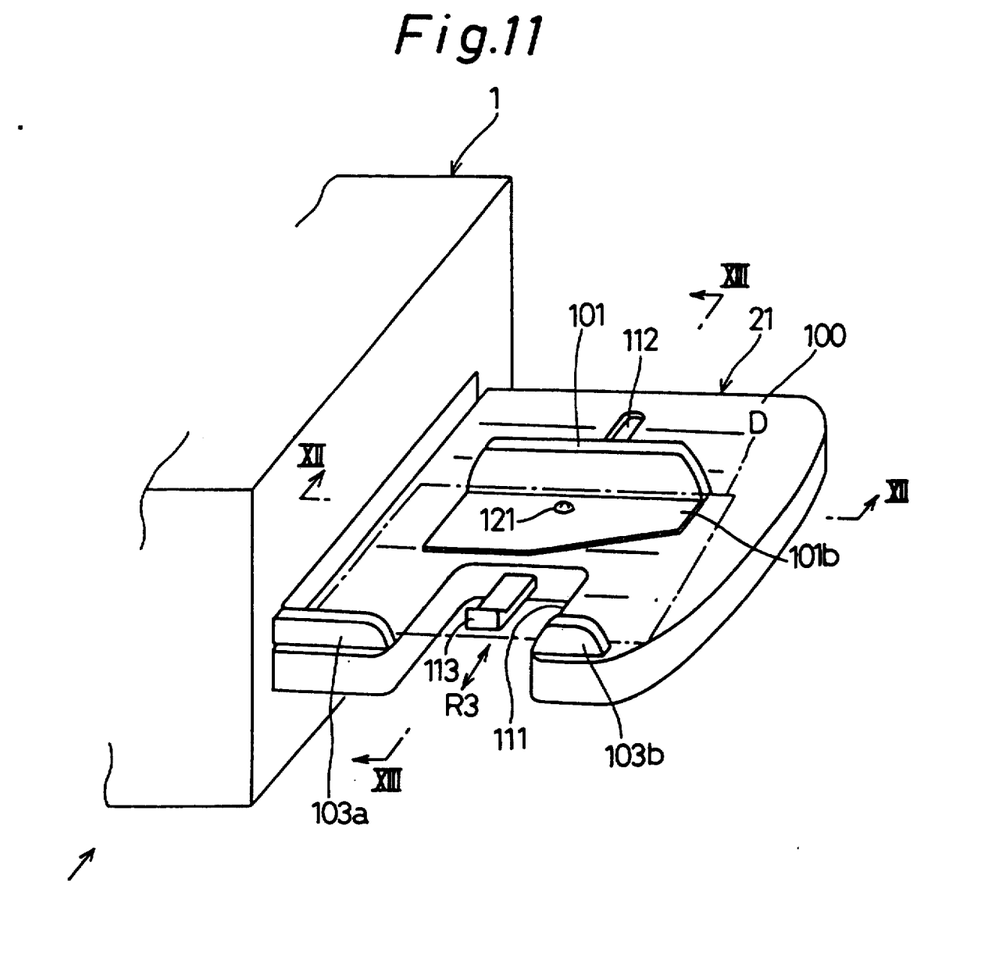
FIG. 11 is a perspective view showing a modified embodiment of an original tray.
Figure 12:
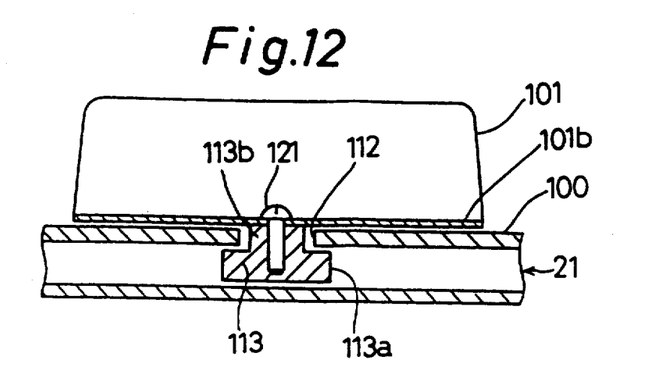
FIG. 12 is a sectional view along the line X II—X II of FIG. 1.
Figure 13:
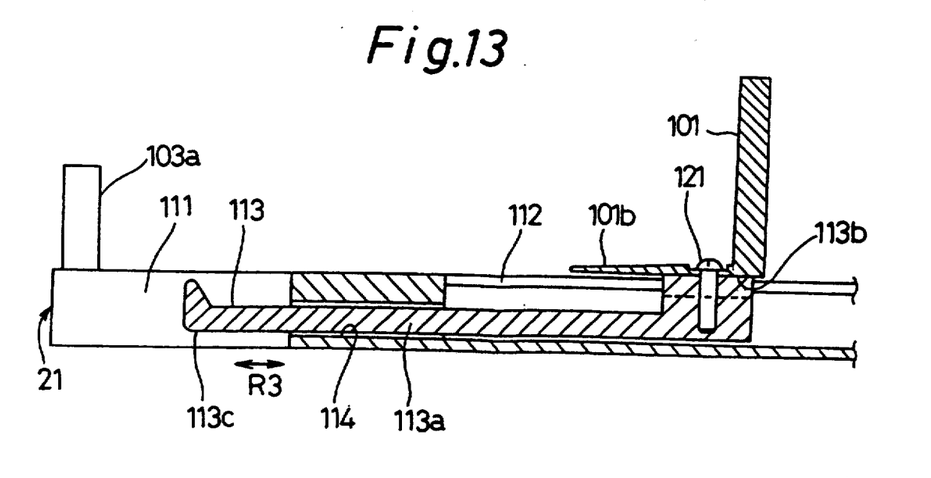
FIG. 13 is a sectional view along the line X III—X III of FIG. 1.

One example of an original tray having a movable member provided with the guide member adjusting lever is shown in FIGS. 11 to 13 as another embodiment of present invention.

Now, this embodiment will be described hereinafter.

As shown in FIG. 11 the original tray 21 comprises a tray body 100 for mounting originals thereon, fixed guide members 103a, 103b upwardly projected at side wall 115 of the tray body 100 and extending in a direction of the length of an original D (in the direction perpendicular to the arrow R3), and a movable guide member 101 projected from the upper surface of the tray body 100 and extending in parallel with the fixed guide members 103a, 103b and movable in a direction of the width of the original D (in the direction of the arrow R3), and the like.

In the tray body 100, a cut-off portion 111 is provided in the middle of the side on which the fixed guide members 103a, 103b are provided. A groove 112 extending in the direction of the width of the original D is provided on the upper surface of the tray body 100.

Onto the bottom surface 101b of the movable guide member 101, a guide member adjusting lever extending toward the front in the direction of the width of the original D is fitted through a screw 121 (See FIG. 12.). A connecting portion 113b of the guide member adjusting lever 113 and the movable guide member 101 is fitted into the groove 112 provided in the tray body 100, and the lever body 113a of the guide member adjusting lever 113 is fitted into a guide opening 114 provided in the tray body 100.

Accordingly, when an operator grasps an operating portion 113c of the guide member adjusting lever 113 and pushes or pulls the guide member adjusting lever 113 backward and forward (in the direction of the arrow R3), the movable guide member 101 is moved integrally with the guide member adjusting lever 113, so that the position of the movable guide member 101 can be adjusted in accordance with the size of the width of the original D.

By providing the above-mentioned guide member adjusting lever 113 on the original tray 21, the movable guide member 101 can be easily moved to a position in accordance with the size of the width of an original D. Since the guide member adjusting lever 113 is provided movable from the cut-off portion 111 in the direction of arrow R3, adjusting operation is easily executed. Further, since the cut-off portion 111 is provided in the tray body 100, the original D can be easily set into the original tray 21. With this arrangement, the facsimile apparatus of this embodiment becomes more convenient to use.

Although the present invention has been fully described by way of example, changes and modifications will be apparent to those skilled in the art. Therefore, unless otherwise such changes and modifications depart from the scope of the present invention, they should be construed as being included therein.

What is claimed is:

1. A facsimile apparatus comprising;
    a first unit,
    a second unit provided on the first unit,
    a third unit provided on the second unit and connected to the second unit so as to make pivotal movement upwardly with respect to the second unit,
    a reading means for reading an image of an original and generating a first image signal according to the image of the original, said reading means being contained in the first unit,
    a signal processing means for transmitting the first image signal through a telephone network, and receiving a second image signal through the telephone network, said signal processing means being contained in the first unit, and
    a recording means for reproducing an image on a recording material from the second image signal, which includes a transport path for transporting said recording material, transport means provided along the transport path for transporting the recording material, and an image forming means for reproducing the image from the second image signal, the transport path and the transport means being contained in the second unit and the image forming means being contained in the third unit.

2. A facsimile apparatus comprising;

a first unit having a reading means for reading an original and generating a first image signal according to the image of the original, and a signal processing means for transmitting the first image signal through a telephone network and receiving a second image signal through the telephone network, a second unit provided on the first unit and having a transport path for transporting a recording material and transport means provided along the transport path for transporting the recording material, and a third unit provided on the second unit so as to make pivotal movement upwardly with respect to the second unit, and having an image forming means for reproducing an image on the recording material according to the second image signal.

3. A facsimile apparatus as claimed in claim 2, wherein the first unit is connected to the second unit through a rotating shaft and performs pivotal movement about the rotating shaft.

4. A facsimile apparatus as claimed in claim 2, wherein the first unit has a first containing portion for containing the reading means and a second containing portion for containing the signal processing means, the first containing portion being capable of making pivotal movement in a horizontal direction with respect to the second containing portion while contacting at one end thereof with the second containing portion.

5. A facsimile apparatus comprising;
a first unit having a first containing portion and a second containing portion, the first containing portion being capable of making pivotal movement in a horizontal direction while contacting at one end thereof with the second containing portion,
a second unit superposed on the first unit,
a reading means for reading an image of an original and generating a first image signal, said reading means being contained in the first containing portion of the first unit,
a signal processing means for transmitting the first image signal through a telephone network and receiving a second image signal through the telephone network, said signal processing means being contained in the second containing portion of the first unit, and
a recording means for reproducing an image on a recording material from the second image signal, and including a transport path for transporting the recording material, transport means provided along the transport path for transporting the recording material, and an image forming means for reproducing an image on the recording material from the second image signal, the transport path, the transport means and the image forming means being contained in the second unit.

6. A facsimile apparatus comprising;
a first unit having a first containing portion in which a reading means for reading an image of an original and generating a first image signal is contained, and a second containing portion in which a signal processing means for receiving a second image signal through a telephone network and transmitting the first image signal through the telephone network, is contained the first containing portion being capable of making pivotal movement in a horizontal direction while contacting at one end thereof with the second containing portion.
a second unit provided on the first unit and having a recording means for reproducing an image on a recording material from the second image signal, the recording means having a transport path for transporting the recording material, transport means provided along the transport path and for transporting the recording material and an image forming means for reproducing an image from the second signal.

7. A facsimile apparatus as claimed in claim 6, wherein the first containing portion is connected through a hinge to the second containing portion and can make pivotal movement in a horizontal direction.

8. A facsimile apparatus as claimed in claim 6, wherein a roller member for making the first containing portion smoothly move in a horizontal direction is provided at one end portion of the bottom surface of the first containing portion.

9. A facsimile apparatus comprising;
a reading means for reading an image of an original and generating a first image signal according to the image of the original,
an original holding means for holding an original for transmission, the original holding means being provided in the reading means,
an original guide means provided on the original holding surface of the original holding means and having a guide member which extends in an original transport direction and is movable in a direction perpendicular to the original transport direction,
an original guide member adjusting means provided in the original holding means so as to move the original guide member in the direction perpendicular the original transport direction,
a signal processing means for transmitting the first image signal through a telephone network and receiving a second image signal through the telephone network, and
a recording means for reproducing an image on a recording material from the second image signal.

10. A facsimile apparatus as claimed in claim 9, wherein the original holding means has a holding plate for holding the original thereon and the guide member is provided on the holding plate.

11. A facsimile apparatus comprising;
a first unit having
a reading means for reading an image of an original and generating a first image signal according to the image of the original,
an original holding means provided adjacent to the reading means for holding an original;
an original guide means provided on the original holding surface of the original holding means and having a guide member which extends in an original transport direction and is movable in a direction perpendicular to the original transport direction;
an original guide member adjusting means provided on the original holding means so as to move the original guide member in the direction perpendicular to the original transport direction; and
a signal processing means for transmitting the first image signal through a telephone network and receiving a second image signal through the telephone network, and
a second unit superposed on the first unit and having a recording means for reproducing an image on a recording material from the second image signal.

12. A facsimile apparatus as claimed in claim 11, wherein the original holding means has a holding plate for holding the original thereon, and the original guide member is slidable in the direction perpendicular to the original tranport direction.

13. A facsimile apparatus as claimed in claim 12, wherein a groove is provided in the inside of the holding plate, and the original guide member adjusting means has a lever passing the groove and extending in a direction of the width of the original.

14. A facsimile apparatus as claimed in claim 11, wherein the original guide member is connected to the original guide member adjusting means.

15. A facsimile apparatus comprising:
  a first unit having a recording means for reproducing an image on a recording material from a first image signal, the recording means having a transport path for transporting the recording material, transport means provided along the transport path for transporting the recording material and an image forming means for reproducing the image on the recording material from the first image signal; and
  a second unit having a first containing portion in which a reading means for reading an image of an original and generating a second image signal is contained, and a second containing portion in which a signal processing means for receiving the first image signal through a telephone network and transmitting the second image signal through the telephone network is contained, the first containing portion being movable from a first position to a second position in a horizontal direction thereof, and the first containing portion being under the first unit in the first position and being at the outside of the first unit in the second position.

16. A facsimile apparatus as claimed in claim 15 wherein the first containing portion further contains a supply means for supplying the original to the reading means integrally with the reading means.

17. A facsimile apparatus comprising:
  a first unit having a reading means for reading an original and generating a first image signal according to the image of the original, and a signal processing means for transmitting the first image signal through a telephone network and receiving a second image signal through the telephone network; and
  a second unit provided upwardly with respect to said first unit, and having a recording means for reproducing an image on a recording material from the second image signal.

18. A facsimile apparatus comprising:
  a reading means for reading an original and generating a first image signal according to the image of the original; and
  a recording means including a transport path provided upwardly with respect to said reading means for transporting the recording material, transport means provided along the transport path for transporting the recording material, and an image forming means provided upwardly with respect to said transport path for reproducing an image on the recording material from a second image signal received through a telephone network.

19. A facsimile apparatus as claimed in claim 18, further comprising:
  a signal processing means provided downwardly with respect to the transport path for transmitting the first image signal through the telephone network and receiving the second image signal through the telephone network.

* * * * *

UNITED STATES PATENT AND TRADEMARK OFFICE
CERTIFICATE OF CORRECTION

PATENT NO. : 5,140,438
DATED : August 18, 1992
INVENTOR(S) : Yoshiyuki Kurahashi, et al.

It is certified that error appears in the above-identified patent and that said Letters Patent is hereby corrected as shown below:

In Col. 2, line 12, change "verious" to --various--.

In Col. 3, line 17, after "section", insert --of--.

In Col. 4, line 4, change "rollers" to --roller--; change "roller" to --rollers--.

In Col. 4, line 31, change "raspectively" to --respectively--.

In Col. 6, line 57, change "portions" to --portion--.

In Col. 6, line 58, change "portion" to --portions--.

In Col. 7, line 9, change "Sea" to --See--.

In Col. 7, line 47, change "oprated" to --operated--.

In Col. 9, lines 62 and 63 (Claim 6, lines 8 and 9), change ", is contained" to --is contained,--.

In Col. 10, line 32 (Claim 9, line 16), before "the", insert --to--.

Signed and Sealed this

Twelfth Day of October, 1993

Attest:

BRUCE LEHMAN

Attesting Officer

Commissioner of Patents and Trademarks